US012313866B2

United States Patent
Hungerland et al.

(10) Patent No.: US 12,313,866 B2
(45) Date of Patent: May 27, 2025

(54) MULTI-LAYER STRUCTURE SUITABLE FOR USE AS A REFLECTOR

(71) Applicant: Covestro Deutschland AG, Leverkusen (DE)

(72) Inventors: Tim Hungerland, Cologne (DE); Rainer Protte, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 177 days.

(21) Appl. No.: 18/039,043

(22) PCT Filed: Nov. 25, 2021

(86) PCT No.: PCT/EP2021/082972
§ 371 (c)(1),
(2) Date: May 26, 2023

(87) PCT Pub. No.: WO2022/112405
PCT Pub. Date: Jun. 2, 2022

(65) Prior Publication Data
US 2024/0004109 A1    Jan. 4, 2024

(30) Foreign Application Priority Data
Nov. 30, 2020    (EP) .................................... 20210706

(51) Int. Cl.
| | |
|---|---|
| G02B 5/08 | (2006.01) |
| B29C 45/00 | (2006.01) |
| B29K 69/00 | (2006.01) |
| B29K 105/16 | (2006.01) |
| B29K 507/04 | (2006.01) |
| B29K 509/08 | (2006.01) |

(52) U.S. Cl.
CPC ........ *G02B 5/0808* (2013.01); *B29C 45/0001* (2013.01); *B29C 45/0013* (2013.01); *B29C 45/0053* (2013.01); *B29C 2045/0079* (2013.01); *B29C 2945/7604* (2013.01); *B29K 2069/00* (2013.01); *B29K 2105/16* (2013.01); *B29K 2507/04* (2013.01); *B29K 2509/08* (2013.01); *B29K 2995/0013* (2013.01); *B29K 2995/0022* (2013.01); *B29K 2995/0094* (2013.01)

(58) Field of Classification Search
CPC ...... B29C 2033/385; B29C 2045/1696; B29C 37/001; B29C 37/0025; B29C 39/025; B29C 39/10; B29C 39/146; B29C 39/20; B29C 41/32; B29C 43/20; B29C 45/0001; B29C 45/0013; B29C 45/0053; B29C 45/14; B29C 45/14811; B29C 45/16; B29C 51/14; G02B 5/0808
See application file for complete search history.

(56) References Cited

U.S. PATENT DOCUMENTS

| | | | |
|---|---|---|---|
| 1,137,373 | A | 4/1915 | Aylsworth |
| 1,191,383 | A | 7/1916 | Aylsworth |
| 2,991,273 | A | 7/1961 | Hechelhammer et al. |
| 2,999,835 | A | 9/1961 | Goldberg |
| 2,999,846 | A | 9/1961 | Schnell et al. |
| 3,148,172 | A | 9/1964 | Fox et al. |
| 3,271,367 | A | 9/1966 | Schnell et al. |
| 3,404,061 | A | 10/1968 | Shane et al. |
| 4,982,014 | A | 1/1991 | Freitag et al. |
| 5,097,002 | A | 3/1992 | Sakashita et al. |
| 5,288,778 | A | 2/1994 | Schmitter et al. |
| 5,340,905 | A | 8/1994 | Kuhling et al. |
| 5,717,057 | A | 2/1998 | Sakashita et al. |
| 6,596,840 | B1 | 7/2003 | Kratschmer et al. |
| 8,357,741 | B2 | 1/2013 | Meyer et al. |
| 8,845,920 | B2 | 9/2014 | Meyer |
| 9,605,129 | B2 | 3/2017 | Meyer et al. |
| 2018/0194926 | A1 | 7/2018 | Samisch et al. |
| 2022/0135755 | A1 | 5/2022 | Schirwitz et al. |

FOREIGN PATENT DOCUMENTS

| | | |
|---|---|---|
| DE | 1570703 | 2/1970 |
| DE | 2036052 A1 | 1/1972 |
| DE | 2063050 | 7/1972 |
| DE | 2211956 | 10/1973 |
| DE | 3832396 A1 | 2/1990 |
| DE | 10006208 A1 | 8/2001 |
| DE | 10022037 A1 | 11/2001 |
| EP | 0500496 A1 | 8/1992 |
| EP | 0839623 A1 | 5/1998 |
| EP | 1559743 A1 | 8/2005 |
| EP | 1865027 A1 | 12/2007 |
| EP | 2785794 B1 | 8/2017 |
| EP | 3115405 A1 | 11/2017 |
| EP | 3502306 A1 | 6/2019 |
| FR | 1561518 A | 3/1969 |
| GB | 1122003 | 7/1968 |
| GB | 1229482 | 4/1971 |
| GB | 1341318 | 12/1973 |
| GB | 1367790 | 9/1974 |
| IT | RM20100225 A1 | 11/2011 |

(Continued)

OTHER PUBLICATIONS

Schnell, Chemistry and Physics of Polycarbonates, 1964, vol. 9, Interscience Publishers, Germany.

*Primary Examiner* — Stella K Yi
(74) *Attorney, Agent, or Firm* — John E. Mrozinski, Jr.

(57) ABSTRACT

The invention relates to a filler-containing multi-layer structure on the basis of a polycarbonate composition, having a metal layer as a reflective layer and having a balanced property profile of CLTE, CLTE ratio, heat conductivity and lustre. This multi-layer structure can be used, inter alia, for reflectors or as a mirror element in head-up displays. Expanded graphite and burned silicon dioxide are contained as fillers. In the composition provided according to the invention, there is no need for an additional heat sink when implementing the component.

15 Claims, No Drawings

(56) References Cited

FOREIGN PATENT DOCUMENTS

| | | |
|---|---|---|
| IT | RM20100227 A1 | 11/2011 |
| IT | RM20100228 A1 | 11/2011 |
| WO | 9615102 A2 | 5/1996 |
| WO | 0105866 A1 | 1/2001 |
| WO | 2004063249 A1 | 7/2004 |
| WO | 2015052106 A2 | 4/2015 |
| WO | 2020193386 A1 | 10/2020 |

MULTI-LAYER STRUCTURE SUITABLE FOR USE AS A REFLECTOR

CROSS-REFERENCE TO RELATED APPLICATIONS

This application is the United States national phase of International Application No. PCT/EP2021/082972 filed Nov. 25, 2021, and claims priority to European Patent Application No. 20210706.6 filed Nov. 30, 2020, the disclosures of which are hereby incorporated by reference in their entireties.

BACKGROUND OF THE INVENTION

Field of the Invention

The invention relates to a layer arrangement, comprising a substrate layer and a metal layer, wherein the substrate layer has a high surface quality, minimized coefficients of thermal expansion and good thermal conductivities. The thermoplastic substrate layer consists of a polycarbonate-based composition.

Description of Related Art

Due to their high heat distortion resistance, polycarbonate-based, and of these in particular copolycarbonate-based, molding compounds are particularly well-suited for components that are exposed to high ambient temperatures as well as potential "hotspots". In particular, headlamp reflectors and further components in headlamps, but also, for example, mirror optics in head-up displays installed in the automobile interior, experience high temperatures on account of the radiated heat of the lighting means (e.g. LEDs through the semiconductor, xenon, halogen) or via solar irradiation, and both their thermomechanical properties and their shape must not change during this.

Temperature stability especially means the property of the material of not significantly geometrically changing in the event of temperature changes (in particular hotspots as a result of solar irradiation). For polymers, this property is achieved by adding usually large amounts of filler having a low coefficient of thermal expansion.

However, the use of large amounts of filler in polycarbonate leads to a marked decrease in the flow properties, which in turn results in certain limits to the processability of the material. This is particularly problematic with regard to challenging component geometries (change from monolithic to multirefractor design with ever smaller functional units), such as with substrate layers of headlamp reflectors.

Since headlamp reflectors are also components having very high quality requirements placed on the metal surface, the underlying substrate layer must also have a very high surface quality, measured on the basis of the roughness of the substrate surface and the associated gloss. Compared to unfilled polymers, a very high surface quality for filler-containing materials can be ensured only through special a processing operation—the dynamic temperature control of the mold, as described in EP 2 785 794 A1. Depending on the nature of the filler and the filler content, different qualities can be achieved.

The thermal expansion of a component and the associated stability of a light-optical projection, which is essential in reflectors and head-up displays, is also dependent on the material-intrinsic capacity for heat distribution/dissipation. This property is practically absent from pure polymers (insulators). Here too, the thermal conductivity of the whole molding compound can be markedly improved by addition of suitable fillers that themselves have a high thermal conductivity. However, the addition of corresponding fillers to conventional compositions is at the expense of the maximum achievable surface quality, even with use of dynamic temperature control of the mold. In addition, the flow behaviour of the polymer melt, measurable on the basis of the melt viscosity of the molding compound, and the ductility of the molding, are also significantly degraded depending on the amount and nature of the filler.

Due to the ever-increasing requirements placed on design and performance in automobile headlamps, there is a trend towards multilayer hybrid structures. Such structures comprise a layer or a body made of a metallic material, e.g. aluminum or magnesium, which functions as a heat sink, a thermoplastic material applied thereto and having high surface quality, and a further reflection layer made of metal. When combining such materials, the thermoplastic material should have a coefficient of thermal expansion that is similar to the metal, in order to achieve a thermally induced warpage that is as synchronous as possible and hence to ensure a long-lasting adhesion. In the situation to date, this can only be achieved by highly filled thermoplastics since metal, e.g. aluminum, has a coefficient of expansion of <30 ppm/K and pure thermoplastics have a coefficient of thermal expansion of >60 ppm/K. One possibility for replacing such metal-thermoplastic hybrids would be the combination of two (like or different) thermoplastics in which one material must have a very high thermal conductivity and hence act as a heat sink. The second material would be unfilled and would thus provide the necessary surface quality for the reflection layer.

However, the inventors of the present application have been struck by the further notion of a functionally alternative component which would be much more attractive both in terms of component production and in the context of later recyclability. If it were to be possible to identify a material that both has the thermal conductivity required for use as a heat sink and also simultaneously offers the required surface quality of the surface material, it would be possible to produce new reflectors in one-component injection molding with subsequent metallization.

However, the challenge lies in the combination of all of the aforementioned properties: In particular for high-precision light optics which nowadays are based on LED and laser technologies, maximizing the light stability is a central feature for increased road traffic safety. The viability of more complex geometries and hence of more innovative designs, which requires a corresponding flowability of the material, also places high requirements on such a material. In addition, it must be possible to realize surfaces having a high surface quality. An object was therefore that of providing corresponding layer arrangements, also called layer structures, that satisfy the aforementioned requirements and are simpler in structure than the conventional multilayer hybrid structures with their aforementioned three essential core layers. It has surprisingly been found that production via one-component injection molding technology with dynamic temperature control of the mold and subsequent metallization is possible using specific thermoplastic compositions.

SUMMARY OF THE INVENTION

The invention therefore provides layer structures comprising
i) a substrate layer made of a thermoplastic polycarbonate-based composition, containing
   a) 44% to 63% by weight of aromatic polycarbonate,
   b) 3% to 8% by weight of expanded graphite,
   c) 34% to 38% by weight of fused silica,
   d) 0% to 10% by weight of one or more further additives,
   wherein the total amount of expanded graphite and fused silica is at least 40% by weight, and
ii) a metal layer applied to the substrate layer i.

The total amount of expanded graphite and fused silica as per components b and c, i.e. the sum total of the individual amounts thereof, is preferably at least 42% by weight, more preferably at least 42.5% by weight, particularly preferably at least 44% by weight, very particularly preferably at least 45% by weight.

"Substrate layer made of a thermoplastic . . . composition" means that the substrate layer consists of the composition or includes a subregion consisting of the composition. The substrate layer preferably consists of the composition.

For the purposes of the invention, "layer structure" means a sequence of at least the layers i and ii, that is to say two layers, and could also be referred to with the term "multilayer structure". In principle, further layers are also possible, but layer structures that are preferred according to the invention comprise only the layers i and ii.

Preferred layer structures according to the invention are those in which the thermoplastic polycarbonate-based composition of substrate layer i contains
   a) 54% to 60% by weight of aromatic polycarbonate,
   b) 5% to 7.5% by weight of expanded graphite,
   c) 35% to 37.5% by weight of fused silica,
   d) 0% to 5% by weight of one or more further additives.

Particularly preferred layer structures according to the invention comprise
i) a substrate layer made of a thermoplastic polycarbonate-based composition and
ii) a metal layer applied to the substrate layer i, wherein the thermoplastic polycarbonate-based composition of substrate layer i consists of the following components:
   a) 54% to 60% by weight of aromatic polycarbonate,
   b) 5% to 7.5% by weight of expanded graphite, very particularly preferably having a D(0.5) of the expanded graphite of 700 µm to 1200 µm, determined by sieve analysis in accordance with DIN 51938:2015-09,
   c) 35% to 37.5% by weight of fused silica, very particularly preferably having a D(0.5) of the fused silica of 3 µm to 5 µm, determined in accordance with ISO 13320:2009-10.
   d) 0% to 5% by weight of one or more further additives, wherein the total amount of expanded graphite and fused silica is at least 40% by weight, in particular at least 42% by weight, where the additives present are very particularly preferably at least one heat stabilizer, at least one mold-release agent and carbon black, and extremely preferably no further additives are present.

Layer structures according to the invention may be a component element for an extremely wide variety of applications.

Such a layer structure is preferably part of a reflector or forms the reflector. Together with a light source and possibly an enclosure or possibly a housing, for example a headlamp housing, this forms part of an illumination apparatus, the reflector being arranged so that at least a portion of the light emitted from the light source is reflected by the reflector. One example of such an illumination apparatus is a headlamp, as is used in motor vehicles in particular as a front light headlamp. According to the invention, the component is likewise preferably a mirror element of a head-up display. Such a mirror element in a head-up display has the purpose of projecting the desired image onto the windshield.

It will be appreciated that, in addition to the substrate layer and the metal layer, one or more further layers may be part of the layer structure. Such layers are in particular protective layers. A layer structure according to the invention preferably does not comprise any further layers besides the substrate layer, the metal layer and one or more protective layers.

Preferred embodiments of the layer structures, in particular also with respect to the thermoplastic polycarbonate-based composition, are described hereinbelow. It will be appreciated that preferred embodiments can be combined with one another, in the absence of any statement to the contrary.

The invention likewise provides a method for producing the layer structures. This method comprises the steps in which
a) the substrate layer is formed from the thermoplastic polycarbonate-based composition described elsewhere in this application by one-component injection molding with dynamic temperature control of the mold and then
b) a metal layer is applied to this substrate layer.

The metal layer acts as a reflection layer which at least partially reflects light in the wavelength range from 380 nm to 750 nm. In the simplest case, the metal layer has a fully reflective configuration analogously to a mirror layer.

It may for example be an aluminum layer or a noble metal layer. The layer may be applied by chemical processes, in particular chemical vapor deposition (CVD) or galvanization, or by physical processes, in particular physical vapor deposition (PVD), or sputtering. The processes are described in more detail, for example, in "Vakuumbeschichtung Bd.1 bis 5" [Vacuum Coating Vol. 1 to 5], H. Frey, VDI-Verlag Dusseldorf 1995 or in "Oberflächen-und Dünnschicht-Technologie" [Surface and Thin-Film Technology] Part 1, R. A. Haefer, Springer Verlag 1987.

The reflection layer, i.e. the metal layer, of the layer structure according to the invention preferably has a thickness of from ≥10 nm to ≤1000 nm, more preferably ≥50 nm to ≤800 nm, particularly preferably ≥60 nm to ≤500 nm, very particularly preferably ≥60 nm to ≤300 nm, determined by means of atomic force microscopy. This is the total thickness of the metal layer. If, for example, two layers of different metals are placed atop one another, the thickness of the metal layer of the layer structure is the sum total of the thicknesses of these two layers.

In order to achieve better metal adhesion and in order to clean the substrate surface, the surface to be coated can be subjected to a plasma pretreatment. A plasma pretreatment can under some circumstances change the surface properties of polymers. These methods are described, for example, in Friedrich et al. in "Metallized plastics 5&6: Fundamental and applied aspects" and in H. Grunwald et al. "Surface and Coatings Technology, 111 (1999), 287-296". However, a plasma pretreatment is not necessary for producing the layer structure according to the invention.

The metal layer preferably contains at least one element selected from Ag, Al, Au, Pt, Fe, Cr, Sn, In, Ti, Pd, Nb, Cu, V, stainless steel or alloys thereof. Preferably, the layer is an aluminum, silver, gold, palladium or copper layer, particularly preferably a silver or aluminum layer.

The metal layer completely or partly covers the substrate layer. If the metal layer only partly covers the substrate layer, at least 60%, preferably at least 70%, further preferably at least 80%, particularly preferably at least 90%, of the substrate layer is covered by the metal layer.

The metal layer, for protection from oxidation or protection from other damage, may be provided with one or more further layers etc. that form the protective layer(s). To this end, the metal layer is optionally preferably bounded on one or both sides by one or more metal oxide or metal nitride layers that enable the homogeneous deposition of metal and/or protect the metal as protective layer—here also called sacrificial layer. Suitable oxides and/or nitrides are especially aluminum oxide, titanium dioxide, silicon oxide SiOx, tantalum pentoxide $Ta_2O_5$, zirconium oxide, zirconium dioxide, niobium oxide, hafnium oxide, zinc tin oxide, indium tin oxide, aluminum zinc oxide, silicon nitride, boron nitride or titanium nitride. However, these layers do not form part of the metal layer.

Alternatively or additionally useful are protective layers other than metal oxide or metal nitride layers, which protect the metal layer or metal-like layers from external effects, i.e. protect from corrosion or else from other external effects such as detergents, scratches, etc. Such protective layers may be applied in a PECVD(plasma-enhanced chemical vapor deposition) process or plasma polymerization process. In this case, low-boiling precursors, especially siloxane-based precursors, are evaporated into a plasma and hence activated such that they can form a film. Typical substances here are hexamethyldisiloxane (HMDSO), tetramethyldisiloxane, decamethylcyclopentasiloxane, octamethylcyclotetrasiloxane and trimethoxymethylsilane, particular preference being given to hexamethyldisiloxane. Very particularly preferably, the protective layer is a layer containing hexamethyldisiloxane (HMDSO). The total thickness of the protective layer is preferably not more than 100 nm, more preferably less than 100 nm and particularly preferably less than 50 nm, very particularly preferably less than 35 nm.

Preferably, the protective layer(s), or the metal layer when no protective layer is present, which is a preferred embodiment in the case of metal layers of gold and/or platinum, is/are not followed by any further layer. The protective layers described are also generally not absolutely necessary in the layer structure according to the invention, meaning that in one embodiment no protective layer is applied to the metal layer. The layer structure according to the invention is preferably a structure formed of only layers i and ii. For use in applications such as reflectors, the provided composition requires no heat sink element and instead multiple functions are performed by the multilayer structure according to the invention alone.

Various modifications may be undertaken on the above-mentioned layer structure. For example, two layers of silver may be used or different layer thicknesses may be used.

The layer structure may be planar and thus serve as a simple mirror. However, according to a further embodiment, the layer structure is not planar. The layer structure may then act as a converging or diverging mirror. The layer structure may for example be in the form of a paraboloid of revolution.

Applications of the layer structure according to the invention are headlamp reflectors, but also, for example, mirror optics in head-up displays. Headlamp reflectors or mirror optics in head-up displays, comprising a layer structure according to the invention, are thus likewise provided by the present invention.

Thermoplastic Substrate Layer

The components of the thermoplastic composition of the substrate layer are described below. It will be appreciated that the % by weight figures are based in each case on the total weight of the respectively described composition.

It will further be appreciated that the employed components may contain typical impurities arising for example from their production process. It is preferable to use the purest possible components. It will further be appreciated that these impurities may also be present in the event of an exhaustive formulation of the composition. They then contribute to the respective proportion by weight of the component from which they originate and are to be included in said proportion by weight.

Component A

Component a of the compositions are aromatic polycarbonates.

Aromatic polycarbonates in the context of the present invention include not only homopolycarbonates but also copolycarbonates and/or polyestercarbonates; the polycarbonates may be linear or branched in a known manner. Mixtures of polycarbonates may also be used according to the invention.

The thermoplastic polycarbonates preferably have weight-average molecular weights $M_w$ of 15 000 g/mol to 40 000 g/mol, more preferably to 34 000 g/mol, particularly preferably of 17 000 g/mol to 33 000 g/mol, in particular of 19 000 g/mol to 32 000 g/mol, determined by gel permeation chromatography, calibrated against bisphenol A polycarbonate standards using dichloromethane as eluent, calibration with linear polycarbonates (formed from bisphenol A and phosgene) of known molar mass distribution from PSS Polymer Standards Service GmbH, Germany, and calibration by method 2301-0257502-09D(2009 German-language edition) from Currenta GmbH & Co. OHG, Leverkusen. The eluent is dichloromethane. Column combination of cross-linked styrene-divinylbenzene resins. Diameter of analytical columns: 7.5 mm; length: 300 mm. Particle sizes of column material: 3 μm to 20 μm. Concentration of solutions: 0.2% by weight. Flow rate: 1.0 ml/min, temperature of solutions: 30° C. Use of UV and/or RI detection.

A portion of up to 80 mol %, preferably of 20 mol % to 50 mol %, of the carbonate groups in the polycarbonates employed according to the invention may be replaced by aromatic dicarboxylic ester groups. Polycarbonates of this type that have not only acid moieties derived from carbonic acid but also acid moieties derived from aromatic dicarboxylic acids incorporated into the molecular chain are termed aromatic polyestercarbonates. For the purposes of the present invention, they are subsumed within the umbrella term "thermoplastic aromatic polycarbonates".

The polycarbonates are produced in a known manner from dihydroxyaryl compounds, carbonic acid derivatives, optionally chain terminators and optionally branching agents, and the polyestercarbonates are produced by replacing a portion of the carbonic acid derivatives with aromatic dicarboxylic acids or derivatives of the dicarboxylic acids, and specifically with aromatic dicarboxylic ester structural units according to the carbonate structural units to be replaced in the aromatic polycarbonates.

Dihydroxyaryl compounds suitable for producing polycarbonates are those of formula (1)

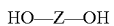  (1), in which
Z is an aromatic radical which has 6 to 30 carbon atoms and may contain one or more aromatic rings, may be substituted, and may contain aliphatic or cycloaliphatic radicals or alkylaryls or heteroatoms as bridging elements.

It is preferable for Z in formula (1) to be a radical of formula (2)

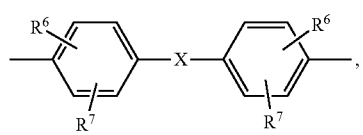  (2)

in which
$R^6$ and $R^7$ independently of one another are H, $C_1$- to $C_{18}$-alkyl, $C_1$- to $C_{18}$-alkoxy, halogen such as Cl or Br or in each case optionally substituted aryl or aralkyl, preferably H or $C_1$- to $C_{12}$-alkyl, particularly preferably H or $C_1$- to $C_8$-alkyl and very particularly preferably H or methyl, and X is a single bond, —$SO_2$—, —CO—, —O—, —S—, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, or else $C_6$- to $C_{12}$-arylene which may optionally be fused to further aromatic rings containing heteroatoms.

X is preferably a single bond, $C_1$- to $C_5$-alkylene, $C_2$- to $C_5$-alkylidene, $C_5$- to $C_6$-cycloalkylidene, —O—, —SO—, —CO—, —S—, —$SO_2$— or a radical of formula (3)

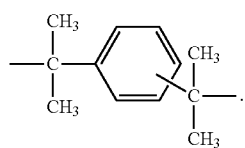  (3)

Examples of dihydroxyaryl compounds are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis(hydroxyphenyl) sulfones, bis(hydroxyphenyl) sulfoxides, 1,1'-bis(hydroxyphenyl)diisopropylbenzenes and the ring-alkylated and ring-halogenated compounds thereof.

Dihydroxyaryl compounds suitable for the production of the polycarbonates and copolycarbonates for use in accordance with the invention are for example hydroquinone, resorcinol, dihydroxydiphenyl, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes and the alkylated, ring-alkylated and ring-halogenated compounds thereof. Copolycarbonates may also be produced using Si-containing telechelics to obtain what are known as Si-copolycarbonates.

Preferred dihydroxyaryl compounds are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC), and also the bisphenols of formulae (I) to (III)

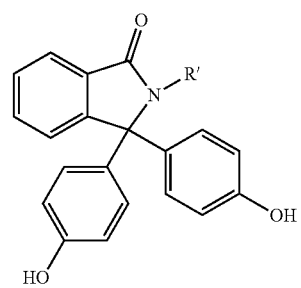  (I)

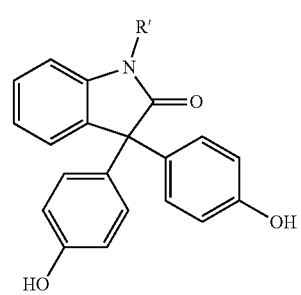  (II)

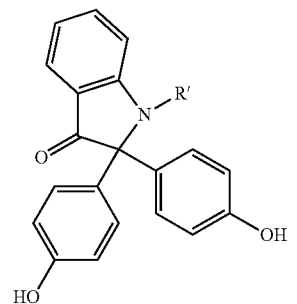  (III)

in which each R' represents a $C_1$- to $C_4$-alkyl radical, aralkyl radical or aryl radical, preferably a methyl radical or phenyl radical, very particularly preferably a methyl radical.

Particularly preferred dihydroxyaryl compounds are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC), and also the dihydroxyaryl compounds of formulae (I), (II) and/or (III).

These and further suitable dihydroxyaryl compounds are described, for example, in U.S. Pat. No. 2,999,835 A, 3 148 172 A, 2 991 273 A, 3 271 367 A, 4 982 014 A and 2 999 846 A, in German laid-open specifications 1 570 703 A, 2 063 050 A, 2 036 052 A, 2 211 956 A and 3 832 396 A, in French patent specification 1 561 518 A1, in the monograph "H. Schnell, Chemistry and Physics of Polycarbonates, Interscience Publishers, New York 1964, p. 28 ff.; p. 102 ff.", and in "D. G. Legrand, J. T. Bendler, Handbook of Polycarbonate Science and Technology, Marcel Dekker New York 2000, p. 72ff.".

In the case of the homopolycarbonates, only one dihydroxyaryl compound is used; in the case of copolycarbonates, two or more dihydroxyaryl compounds are used.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane or the two monomers bisphenol A and 4,4'-dihydroxydiphenyl, and homo- or copolycarbonates derived from the dihydroxyaryl compounds of formulae (I), (II) and/or (III)

(I)

(II)

(III)

in which each R' is $C_1$- to $C_4$-alkyl, aralkyl or aryl, preferably methyl or phenyl, very particularly preferably methyl,
in particular with bisphenol A.

The total proportion of the monomer units based on the formulae (I), (II), (III), 4,4'-dihydroxydiphenyl and/or bisphenol TMC in the copolycarbonate is preferably 0.1-88 mol %, particularly preferably 1-86 mol %, very particularly preferably 5-84 mol % and in particular 10-82 mol % (based on the sum total of the moles of dihydroxyaryl compounds used).

The dihydroxyaryl compounds used, similarly to all other chemicals and auxiliaries added to the synthesis, may be contaminated with the contaminants from their own synthesis, handling and storage. It is however desirable to work with the purest possible raw materials.

The copolycarbonates may be in the form of block copolycarbonate and random copolycarbonate. Random copolycarbonates are particularly preferred.

The ratio of the frequency of the diphenoxide monomer units in the copolycarbonate is derived here from the molar ratio of the dihydroxyaryl compounds used.

The relative solution viscosity of the copolycarbonates, determined in accordance with ISO 1628-4:1999, is preferably in the range of 1.15-1.35.

The monofunctional chain terminators needed to regulate the molecular weight, such as phenols or alkylphenols, especially phenol, p-tert-butylphenol, isooctylphenol, cumylphenol, their chlorocarbonic esters or acyl chlorides of monocarboxylic acids or mixtures of these chain terminators, are either supplied to the reaction together with the bisphenoxide(s) or else added to the synthesis at any time, provided that phosgene or chlorocarbonic acid end groups are still present in the reaction mixture, or, in the case of the acyl chlorides and chlorocarbonic esters as chain terminators, provided that sufficient phenolic end groups of the incipient polymer are available. However, it is preferable for the chain terminator(s) to be added after the phosgenation at a location or at a juncture at which phosgene is no longer present but the catalyst has not yet been metered in, or for them to be metered in before the catalyst or together or in parallel with the catalyst.

Any branching agents or branching agent mixtures to be used are added to the synthesis in the same manner, but typically before the chain terminators. Compounds typically used are trisphenols, quaterphenols or acyl chlorides of tri- or tetracarboxylic acids, or else mixtures of the polyphenols or of the acyl chlorides.

Examples of some of the compounds usable as branching agents and having three or more phenolic hydroxyl groups include phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tris(4-hydroxyphenyl)benzene, 1,1,1-tri (4-hydroxyphenyl)ethane, tris(4-hydroxyphenyl) phenylmethane, 2,2-bis[4,4-bis(4-hydroxyphenyl) cyclohexyl]propane, 2,4-bis(4-hydroxyphenylisopropyl) phenol, tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

In the former case the acid derivatives used are preferably phosgene and optionally dicarbonyl dichlorides and in the latter case preferably diphenyl carbonate and optionally dicarboxylic diesters. Catalysts, solvents, workup, reaction conditions etc. for polycarbonate preparation or polyestercarbonate preparation are sufficiently well described and known for both cases.

Also preferred are copolycarbonates prepared using diphenols of general formula (1a):

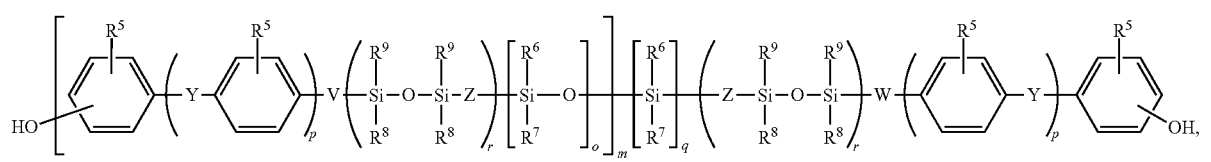

(1a)

Preferred branching agents are 3,3-bis(3-methyl-4-hydroxyphenyl)-2-oxo-2,3-dihydroindole and 1,1,1-tri(4-hydroxyphenyl)ethane.

The amount of any branching agents to be used is 0.05 mol % to 2 mol %, based in turn on moles of diphenols used in each case.

The branching agents may either be initially charged with the diphenols and the chain terminators in the aqueous alkaline phase or added dissolved in an organic solvent before the phosgenation.

All of these measures for preparing the polycarbonates are familiar to those skilled in the art.

Examples of aromatic dicarboxylic acids that are suitable for the preparation of the polyestercarbonates include orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulfone dicarboxylic acid, 2,2-bis(4-carboxyphenyl)propane, trimethyl-3-phenylindane-4,5'-dicarboxylic acid.

Among the aromatic dicarboxylic acids, particular preference is given to using terephthalic acid and/or isophthalic acid.

Derivatives of dicarboxylic acids are dicarbonyl dihalides and dialkyl dicarboxylates, especially dicarbonyl dichlorides and dimethyl dicarboxylates.

Replacement of the carbonate groups by the aromatic dicarboxylic ester groups is substantially stoichiometric, and also quantitative, and the molar ratio of the reactants is therefore also maintained in the final polyestercarbonate. The aromatic dicarboxylic ester groups may be incorporated either randomly or in blocks.

Preferred modes of preparation of the polycarbonates to be used in the invention, including the polyestercarbonates, are the known interfacial process and the known melt transesterification process (cf. e.g. WO 2004/063249 A1, WO 2001/05866 A1, U.S. Pat. Nos. 5,340,905 A, 5,097,002 A, 5,717,057 A).

in which $R^5$ is hydrogen or $C_1$- to $C_4$-alkyl, $C_1$- to $C_3$-alkoxy, preferably hydrogen, methoxy or methyl, $R^6$, $R^7$, $R^8$ and $R^9$ each independently of one another are $C_1$- to $C_4$-alkyl or $C_6$- to $C_{12}$-aryl, preferably methyl or phenyl, Y is a single bond, $SO_2$—, —S—, —CO—, —O—, $C_1$- to $C_6$-alkylene, $C_2$- to $C_5$-alkylidene, $C_6$- to $C_{12}$-arylene which may optionally be fused to further aromatic rings containing heteroatoms or is a $C_5$- to $C_6$-cycloalkylidene radical which may be mono- or polysubstituted by $C_1$- to $C_4$-alkyl, preferably is a single bond, —O—, isopropylidene or a $C_5$- to $C_6$-cycloalkylidene radical which may be mono- or polysubstituted by $C_1$- to $C_4$-alkyl, V is oxygen, $C_2$- to $C_6$-alkylene or $C_3$- to $C_6$-alkylidene, preferably oxygen or $C_3$-alkylene, p, q and r are each independently 0 or 1, when q=0, W is a single bond, when q=1 and r=0, W is oxygen, $C_2$- to $C_6$-alkylene or $C_3$- to $C_6$-alkylidene, preferably oxygen or $C_3$-alkylene, when q=1 and r=1, W and V each independently are $C_2$- to $C_6$-alkylene or $C_3$- to $C_6$-alkylidene, preferably $C_3$-alkylene, Z is a $C_1$- to $C_6$-alkylene, preferably $C_2$-alkylene, is an average number of repeating units of from 10 to 500, preferably 10 to 100, and m is an average number of repeating units of from 1 to 10, preferably 1 to 6, more preferably 1.5 to 5. It is likewise possible to use diphenols in which two or more siloxane blocks of general formula (1a) are joined to one another via terephthalic acid and/or isophthalic acid to form ester groups.

Especial preference is given to (poly)siloxanes of formulae (2) and (3)

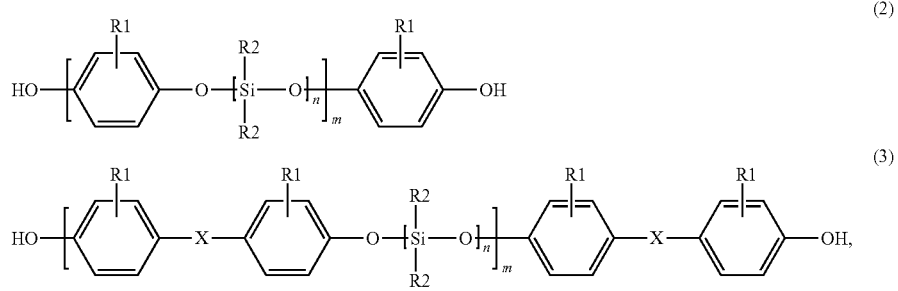

in which R1 is hydrogen, $C_1$- to $C_4$-alkyl, preferably hydrogen or methyl and especially preferably hydrogen, each R2 independently is aryl or alkyl, preferably methyl, X is a single bond, —$SO_2$—, —CO—, —O—, —S—, $C_1$- to $C_6$-alkylene, $C_2$- to $C_5$-alkylidene or $C_6$- to $C_{12}$-arylene which may optionally be fused to further aromatic rings containing heteroatoms, X preferably is a single bond, $C_1$- to $C_5$-alkylene, $C_2$- to $C_5$-alkylidene, $C_5$- to $C_{12}$-cycloalkylidene, —O—, —SO—, —CO—, —S—, —$SO_2$—, particularly preferably X is a single bond, isopropylidene, $C_5$- to $C_{12}$-cycloalkylidene or oxygen, and very particularly preferably is isopropylidene, n is an average number of from 10 to 400, preferably 10 to 100, especially preferably 15 to 50 and m is an average number of from 1 to 10, preferably from 1 to 6 and especially preferably from 1.5 to 5.

The siloxane block may likewise preferably be derived from the following structure wherein a in formulae (IV), (V) and (VI) is an average number of from 10 to 400, preferably 10 to 100 and particularly preferably 15 to 50.

It is likewise preferable when at least two identical or different siloxane blocks of general formulae (IV), (V) or (VI) are joined to one another via terephthalic acid and/or isophthalic acid to form ester groups.

It is likewise preferable when in formula (1a) p=0, V is $C_3$-alkylene, r=1, Z is $C_2$-alkylene, $R^8$ and $R^9$ are methyl, q=1, W is $C_3$-alkylene, m=1, $R^5$ is hydrogen or $C_1$- to $C_4$-alkyl, preferably hydrogen or methyl, $R^6$ and $R^7$ each independently of one another are $C_1$- to $C_4$-alkyl, preferably methyl, and o is 10 to 500.

Copolycarbonates having monomer units of formula (1a) and in particular also the preparation thereof are described in WO 2015/052106 A2.

Copolycarbonates having monomer units of formula (IV) and in particular also the preparation thereof are described in WO 2015/052106 A2.

Compositions in the context of the invention are "polycarbonate-based compositions". These are those composi-

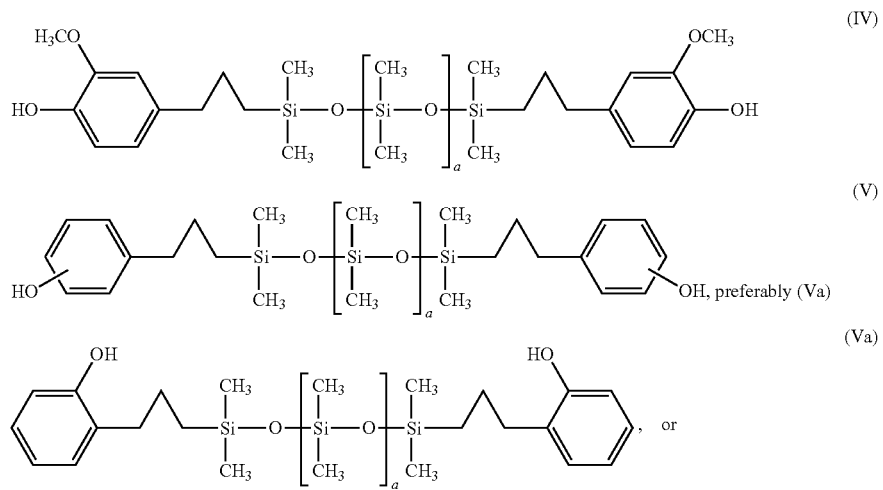

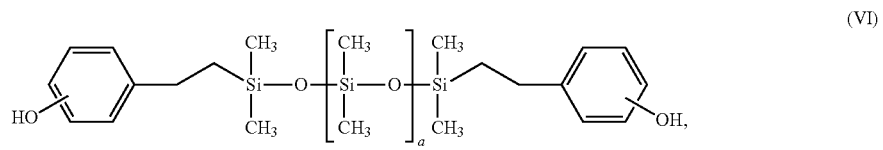

tions wherein the base material, i.e. predominant component present, is a polycarbonate. "Predominant" here means at least 44% by weight, preferably at least 50% by weight, more preferably at least 54% by weight, particularly preferably up to 60% by weight, of aromatic polycarbonate, based on the overall composition.

COMPONENT B

As component b of the thermoplastic compositions of the substrate layer of the multilayer structure, expanded graphite is used. The graphite used may be one type of expanded graphite, but it may also be a mixture of two or more types.

In the expanded graphites, the individual basal planes of the graphite have been driven apart by a special treatment which results in an increase in volume of the graphite, preferably by a factor of 200 to 400. The production of expanded graphites is described inter alia in documents U.S. Pat. Nos. 1,137,373 A, 1,191,383 A and 3,404,061 A.

Graphites are used in the compositions in the form of fibers, rods, spheres, hollow spheres, platelets, in powder form, in each case either in aggregated or agglomerated form, preferably in platelet form.

In the present invention, the structure in platelet form is understood to mean a particle having a flat geometry. Thus, the height of the particles is typically markedly smaller compared to the width or length of the particles. Flat particles of this kind may in turn be agglomerated or aggregated into structures.

The height of the primary particles in platelet form, determined by atomic force microscopy AFM, is less than 500 nm, preferably less than 200 nm and particularly preferably less than 100 nm. As a result of the small sizes of these primary particles, the shape of the particles may be bent, curved, waved or deformed in some other way.

The length dimensions of the particles can be determined by standard methods, for example electron microscopy.

Graphite is used in the thermoplastic compositions according to the invention in amounts of from 3.0% to 8.0% by weight, preferably 5.0% to 7.5% by weight, in order to obtain good thermal conductivity of the thermoplastic compositions.

Preference according to the invention is given to using a graphite having a relatively high specific surface area, determined as the BET surface area by means of nitrogen adsorption in accordance with ASTM D3037:1993. Preference is given to using graphites having a BET surface area of $\geq 5$ m$^2$/g, particularly preferably $\geq 10$ m$^2$/g and very particularly preferably $\geq 18$ m$^2$/g in the thermoplastic compositions.

The graphites preferably have a particle size distribution, determined by sieve analysis in accordance with DIN 51938:2015-09, which is characterized by the D(0.5), of at least 400 µm, more preferably of at least 600 µm, more preferably still of at least 650 µm to 1300 µm and particularly preferably of at least 700 µm to 1200 µm, very particularly preferably of 720 µm to <1200 mm. In one embodiment, preference is given to a particle size distribution with a D(0.5) of the expanded graphite of <1000 µm.

Preferably, at least the ranges for D(0.5) apply to the graphite used. More preferably, in addition to this the following preferred ranges for D(0.1) and D(0.9) also apply, either alternatively or, particularly preferably, additively together:

The graphites preferably have a particle size distribution, determined by sieve analysis in accordance with DIN 51938:2015-09, which is characterized by a D(0.9), of at least 1 mm, preferably of at least 1.2 mm, more preferably of at least 1.4 mm and more preferably still of at least 1.5 mm.

The graphites preferably also have a particle size distribution, determined by sieve analysis in accordance with DIN 51938:2015-09, which is characterized by a D(0.1), of at least 100 µm, preferably of at least 150 µm, more preferably of at least 200 µm and more preferably still of at least 250 µm.

The graphites used preferably have a density, determined with xylene, in the range from 2.0 g/cm$^3$ to 2.4 g/cm$^3$, preferably from 2.1 g/cm$^3$ to 2.3 g/cm$^3$ and more preferably from 2.2 g/cm$^3$ to 2.27 g/cm$^3$.

The carbon content of the graphites used in the layer structures according to the invention, determined in accordance with DIN 51903:2012-11 at 800° C. for 20 hours, is preferably $\geq 90\%$, more preferably $\geq 95\%$ and yet more preferably $\geq 98\%$.

The residual moisture content of the graphites used in the layer structures according to the invention, determined in accordance with DIN 51904:2012-11 at 110° C. for 8 hours, is preferably $\leq 5\%$, more preferably $\leq 3\%$ and yet more preferably $\leq 2\%$.

The thermal conductivity of the graphites used in the layer structures according to the invention, prior to processing, is between 250 and 400 W/(m*K) parallel to the basal planes and between 6 and 8 W/(m*K) perpendicular to the basal planes.

The electrical resistivity of the graphites used in the layer structures according to the invention, prior to processing, is about 0.001 Ω*cm parallel to the basal planes and less than 0.1 Ω*cm perpendicular to the basal planes.

The bulk density of the graphites, determined in accordance with DIN 51705:2001-06, is typically between 50 g/11 and 250 g/l, preferably between 65 g/11 and 220 g/l and more preferably between 100 g/11 and 200 g/l.

Preference is given to using graphites having a sulfur content of less than 200 ppm in the thermoplastic compositions of the layer structures according to the invention.

Preference is given to using graphites having a leachable chlorine ion content of less than 100 ppm in the thermoplastic compositions of the layer structures according to the invention.

Preference is likewise given to using graphites having a content of nitrates and nitrites of less than 50 ppm in the thermoplastic compositions of the layer structures according to the invention.

Particular preference is given to using graphites having all of these limiting values, i.e. for the sulfur, chlorine ion, nitrate and nitrite content.

Commercially available graphites are inter alia Ecophit GFG 5, Ecophit GFG 50, Ecophit GFG 200, Ecophit GFG 350, Ecophit GFG 500, Ecophit GFG 900, Ecophit GFG 1200 from SGL Carbon GmbH, TIMREX BNB90, TIMREX KS5-44, TIMREX KS6, TIMREX KS150, TIMREX SFG44, TIMREX SFG150, TIMREX C-THERM™ 001 and TIMREX C-THERM™ 011 from TIMCAL Ltd., SC 20 0, SC 4000 O/SM and SC 8000 O/SM from Graphit Kropfmuhl AG, Mechano-Cond 1, Mechano-Lube 2 and Mechano-Lube 4G from H. C. Carbon GmbH, Nord-Min 251 and Nord-Min 560T from Nordmann Rassmann GmbH and ASBURY A99, Asbury 230U and Asbury 3806 from Asbury Carbons.

Component C

Compositions usable in accordance with the invention for the layer structure contain, as component c, fused silica. Fused silica, also known as "fused silica", is quartz glass, melted and resolidified silicon dioxide. It may be fused silica made from naturally occurring or synthetically produced quartz or made from a combination of the two.

Component c is preferably fused silica that has been produced from processed quartz sand by iron-free milling followed by wind-sifting.

Component c is present in the compositions in an amount of from 34% to 38% by weight, preferably 35% to 37.5% by weight.

The silicon dioxide used in the compositions of the substrate layer preferably has a spherical and/or approximately spherical particle shape. Approximately spherical here means the following: if the sphere is described by axes of equal length proceeding from a common origin and directed into the space, where the axes define the radius of the sphere in all spatial directions, the spherical particles may have a deviation in the axis lengths from the ideal state for the sphere of up to 20% in order to still qualify as approximately spherical.

The fused silica is preferably characterized by a median diameter d(0.5), determined in accordance with ISO 13320: 2009-10, of from 2 to 10 µm, more preferably from 2.5 to 8.0 µm, more preferably still from 3 to 5 µm, with preference being given to an upper diameter d(0.9), determined in accordance with ISO 13320:2009, of correspondingly from 6 to 34 µm, more preferably from 6.5 to 25.0 µm, more preferably still from 7 to 15 µm, and particularly preferably 10 µm.

The fused silica preferably has a specific BET surface area, determined by nitrogen adsorption in accordance with ISO 9277:2010-09, of from 0.4 to 8.0 m$^2$/g, more preferably from 2 to 7 m$^2$/g, and particularly preferably from 4.4 to 6 m$^2$/g.

More preferred still is fused silica that has a maximum of just 3% by weight of secondary constituents, it being preferable for the content of $Al_2O_3$ to be <2.0% by weight, $Fe_2O_3$ to be <0.05% by weight, (CaO+MgO) to be <0.1% by weight, ($Na_2O+K_2O$) to be <0.1% by weight, based in each case on the total weight of the fused silica.

Preference is given to using fused silica having a pH, measured in accordance with ISO 10390:2005 in aqueous suspension, in the range from 6 to 9, more preferably 6.5 to 8.0.

The silicon dioxide preferably has an oil absorption number according to DIN EN ISO 787-5:1995-10 of preferably 20 to 30 g/100 g.

It is possible to use fused silica that has a size on the surface, preference being given to using epoxy-modified, polyurethane-modified and unmodified silane compounds, methylsiloxane and methacryloyl silane sizes, or mixtures of the abovementioned silane compounds. Particular preference is given to an epoxysilane size. The sizing of silicon dioxide is effected by the general methods known to those skilled in the art.

However, it is preferable for the silicon dioxide used for compositions according to the invention to be unsized.

It will be appreciated that fused silica having the properties described as preferred can form component c alone or in a mixture with one or more other fused silicas. Component c is preferably a fused silica having one or more of the properties described as preferred.

Component D

In addition, further additives are optionally present at up to 10% by weight, preferably up to 6% by weight, more preferably up to 5% by weight, more preferably still 0.1% to 0.7% by weight, where these percentages by weight, here as elsewhere, are based on the total weight of the composition.

The group of the further additives does not include any expanded graphite or any fused silica, since these are already described as components b and c.

Examples of such additives, as are typically added to polycarbonate-containing compositions, include heat stabilizers, antistats, UV absorbers, IR absorbers, flame retardants, anti-dripping agents, impact modifiers, antioxidants, inorganic pigments, carbon black, colorants and/or inorganic fillers such as titanium dioxide, silicates, aluminum silicates, talc, chalk, quartz powder, wollastonite, mica/clay layers, montmorillonite, aluminum oxide, magnesium oxide, (unfired) silicon dioxide and/or barium sulfate and/or mold-release agents, for instance described in EP 0 839 623 A1, WO 96/15102 A2, EP 0 500 496 A1 or in "Plastics Additives Handbook", Hans Zweifel, 5th Edition 2000, Hanser Verlag, Munich, in the amounts customary for polycarbonate These additives may be added individually or else as mixture.

Suitable heat stabilizers are in particular phosphorus-based stabilizers selected from the group of the phosphates, phosphites, phosphonites, phosphines and mixtures thereof. It is also possible to use mixtures of different compounds from one of these subgroups, for example two phosphites.

Heat stabilizers preferably used are phosphorus compounds having the oxidation number+III, in particular phosphines and/or phosphites.

Particularly preferably suitable heat stabilizers are triphenylphosphine, tris(2,4-di-tert-butylphenyl) phosphite (Irgafos 168), tetrakis(2,4-di-tert-butylphenyl)-[1,1-biphenyl]-4,4'-diylbisphosphonite, octadecyl 3-(3,5-di-tert-butyl-4-hydroxyphenyl)propionate (Irganox 1076), bis(2,4-dicumylphenyl)pentaerythritol diphosphite (Doverphos S-9228), bis(2,6-di-tert-butyl-4-methylphenyl)pentaerythritol diphosphite (ADK STAB PEP-36).

They are used alone or in a mixture, e.g. Irganox B900 (mixture of Irgafos 168 and Irganox 1076 in a 4:1 ratio) or Doverphos S-9228 with Irganox B900/Irganox 1076.

The heat stabilizers are preferably used in amounts of up to 1.0% by weight, more preferably 0.003% by weight to 1.0% by weight, more preferably still 0.005% by weight to 0.5% by weight, particularly preferably 0.01% by weight to 0.3% by weight.

Preferred mold-release agents are esters of aliphatic long-chain carboxylic acids with mono- or polyhydric aliphatic and/or aromatic hydroxyl compounds. Particular preference is given to pentaerythritol tetrastearate, glycerol monostearate, stearyl stearate and propanediol distearate, or mixtures thereof.

Preferred UV absorbers have minimum transmittance below 400 nm and maximum transmittance above 400 nm. Ultraviolet absorbers particularly suitable for use in the composition according to the invention are benzotriazoles, triazines, benzophenones and/or arylated cyanoacrylates.

Particularly suitable ultraviolet absorbers are hydroxybenzotriazoles such as 2-(3',5'-bis(1,1-dimethylbenzyl)-2'-hydroxyphenyl)benzotriazole (Tinuvin 234, Ciba Spezialitatenchemie, Basle), 2-(2'-hydroxy-5'-(tert-octyl)phenyl) benzotriazole (Tinuvin 329, Ciba Spezialitatenchemie, Basle), 2-(2'-hydroxy-3'-(2-butyl)-5'-(tert-butyl)phenyl)benzotriazole (Tinuvin 350, Ciba Spezialitatenchemie, Basle), bis(3-(2H-benzotriazolyl)-2-hydroxy-5-tert-octyl)methane, (Tinuvin® 360, Ciba Spezialitatenchemie, Basle), (2-(4,6-diphenyl-1,3,5-triazin-2-yl)-5-(hexyloxy)phenol (Tinuvin 1577, Ciba Spezialitatenchemie, Basle), and the benzophenones 2,4-dihydroxybenzophenone (Chimasorb 22, Ciba Spezialitatenchemie, Basle) and 2-hydroxy-4-(octyloxy) benzophenone (Chimassorb 81, Ciba, Basle), 2-cyano-3,3-diphenyl-2-propenoic acid 2-ethylhexyl ester, 2,2-bis[[(2-cyano-1-oxo-3,3-diphenyl-2-propenyl)oxy]methyl]-1,3-propanediyl ester (9CI) (Uvinul 3030, BASF AG Ludwigshafen), 2-[2-hydroxy-4-(2-ethylhexyl)oxy]phenyl- 4,6-di(4-phenyl)phenyl-1,3,5-triazine (CGX UVA 006, Ciba Spezialitatenchemie, Basle) or tetraethyl 2,2'-(1,4-phenylenedimethylidene)bismalonate (Hostavin B-Cap, Clariant AG).

Particularly preferred specific UV stabilizers are, for example, Tinuvin 360, Tinuvin 350, Tinuvin 329, Hostavin B-CAP, more preferably TIN 329 and Hostavin B-Cap. It is also possible to use mixtures of these ultraviolet absorbers. Particularly suitable ultraviolet absorbers are hydroxybenzotriazoles, such as 2-(3',5'-bis(1,1-dimethylbenzyl)-2'-hydroxyphenyl)benzotriazole (Tinuvin 234, BASF SE, Ludwigshafen), 2-(2'-hydroxy-5'-(tert-octyl)phenyl)benzotriazole (Tinuvin 329, BASF SE, Ludwigshafen), bis(3-(2H-benzotriazolyl)-2-hydroxy-5-tert-octyl)methane (Tinuvin 360, BASF SE, Ludwigshafen), 2-(4,6-diphenyl-1,3,5-triazin-2-yl)-5-(hexyloxy)phenol (Tinuvin 1577, BASF SE, Ludwigshafen), 2-(5-chloro-2H-benzotriazol-2-yl)-6-(1,1-dimethylethyl)-4-methylphenol (Tinuvin 326, BASF SE, Ludwigshafen), and also benzophenones such as 2,4-dihydroxybenzophenone (Chimassorb 22, BASF SE, Ludwigshafen) and 2-hydroxy-4-(octyloxy)benzophenone (Chimassorb 81, BASF SE, Ludwigshafen), 2,2-bis[[(2-cyano-1-oxo-3,3-diphenyl-2-propenyl)oxy]methyl]-1,3-propanediyl ester (9CI) (Uvinul 3030, BASF SE Ludwigshafen), 2-[2-hydroxy-4-(2-ethylhexyl)oxy]phenyl-4,6-di(4-phenyl)phenyl-1,3,5-triazine (Tinuvin 1600, BASF SE, Ludwigshafen), tetraethyl 2,2'-(1,4-phenylenedimethylidene)bismalonate (Hostavin B-Cap, Clariant AG) or N-(2-ethoxyphenyl)-N'-(2-ethylphenyl)ethanediamide (Tinuvin 312, CAS no. 23949-66-8, BASF SE, Ludwigshafen).

Particularly preferred specific UV stabilizers are Tinuvin 360, Tinuvin 329, Tinuvin 326, Tinuvin 1600, Tinuvin 312, Uvinul 3030 and/or Hostavin B-Cap, and very particularly preferred are Tinuvin 329 and Tinuvin 360.

If UV absorbers are present, the composition preferably contains UV absorbers in an amount of up to 0.8% by weight, preferably 0.05% by weight to 0.5% by weight, more preferably 0.08% by weight to 0.4% by weight, very particularly preferably 0.1% by weight to 0.35% by weight, based on the overall composition.

Suitable IR absorbers are disclosed, for example, in EP 1 559 743 A1, EP 1 865 027 A1, DE 10022037 A1, DE 10006208 A1 and in Italian patent applications RM2010A000225, RM2010A000227 and RM2010A000228. Among the IR absorbers mentioned in the cited literature, preference is given to those based on boride and tungstate, especially cesium tungstate or zinc-doped cesium tungstate, and also ITO- and ATO-based absorbers and combinations thereof.

The compositions of the invention may also contain phosphates or sulfonic esters as transesterification stabilizers. It is preferable for triisooctyl phosphate to be present as transesterification stabilizer. Triisooctyl phosphate is preferably used in amounts of from 0.003% by weight to 0.05% by weight, more preferably 0.005% by weight to 0.04% by weight and particularly preferably from 0.01% by weight to 0.03% by weight, based on the overall composition.

Suitable colorants may be pigments, organic and inorganic pigments, carbon black and/or dyes. Colorants or pigments in the context of the present invention are sulfur-containing pigments such as cadmium red or cadmium yellow, iron cyanide-based pigments such as Prussian blue, oxide pigments such as zinc oxide, red iron oxide, black iron oxide, chromium oxide, titanium yellow, zinc/iron-based brown, titanium/cobalt-based green, cobalt blue, copper/chromium-based black and copper/iron-based black or chromium-based pigments such as chromium yellow, phthalocyanine-derived dyes such as copper phthalocyanine blue or copper phthalocyanine green, fused polycyclic dyes and pigments such as azo-based (e.g. nickel azo yellow), sulfur indigo dyes, perinone-based, perylene-based, quinacridone-derived, dioxazine-based, isoindolinone-based and quinophthalone-derived derivatives, anthraquinone-based heterocyclic systems.

Specific examples of commercial products are, for example, MACROLEX Blue RR, MACROLEX Violet 3R, MACROLEX Violet B (Lanxess AG, Germany), Sumiplast Violet RR, Sumiplast Violet B, Sumiplast Blue OR, (Sumitomo Chemical Co., Ltd.), Diaresin Violet D, Diaresin Blue G, Diaresin Blue N (Mitsubishi Chemical Corporation), Heliogen Blue or Heliogen Green (BASF AG, Germany). Among these, preference is given to cyanine derivatives, quinoline derivatives, anthraquinone derivatives, phthalocyanine derivatives.

Fillers other than components b and c may likewise be added, provided that they do not impair the level of properties of the present invention by their nature and amount. These may have a particulate, flaky or fibrous character for example. Examples that may be mentioned at this juncture include chalk, barium sulfate, silicates/aluminosilicates, such as for example mica/clay layered minerals, montmorillonite, especially also in an organophilic form modified by ion exchange, kaolin, zeolites, vermiculite, magnesium hydroxide and aluminum hydroxide. It is also possible to use mixtures of different inorganic materials.

The composition preferably does not contain any waxy stabilizers.

The further additives are preferably just one or more selected from the group consisting of heat stabilizers, antistats, UV absorbers, IR absorbers, antioxidants, inorganic pigments, carbon black, colorants, silicates, especially aluminum silicates, chalk, quartz powder, mica/clay layers, montmorillonite, aluminum oxide, magnesium oxide, (unfired) silicon dioxide, barium sulfate and/or mold-release agents.

It is moreover possible to add further constituents which do not impair the level of properties of the present invention by their nature and amount.

It will be appreciated that the thermoplastic compositions of the substrate layer may for example in principle also contain blend partners. Examples of thermoplastic polymers suitable as blend partners are polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, poly- or copolyacrylates, poly- or copolymethacrylate, for example poly- or copolymethylmethacrylates (such as PMMA), and also copolymers with styrene, for example transparent polystyrene-acrylonitrile (PSAN), thermoplastic polyurethanes and/or polymers based on cyclic olefins (e.g. TOPAS, a commercial product from Ticona).

Compositions particularly preferred according to the invention for the substrate layers contain, as additives, at least one heat stabilizer, a mold-release agent and carbon black. In addition to components a, b and c and in each case one or more heat stabilizers, mold-release agents and carbon black, there are very particularly preferably no further components present.

For the substrate layer, the longitudinal and transversal CLTE values, determined in accordance with DIN 53752-Method A:1980, are preferably ≤46.5 ppm/K, with the (longitudinal/transversal) ratio thereof more preferably being ≥0.84, and/or the thermal conductivity of the substrate layer (in-plane) determined in accordance with ASTM E 1461:2013, is preferably ≥0.7 W/(m·K), more preferably ≥0.85 W/(m·K), particularly preferably ≥0.89 W/(m·K) and/or the thermal conductivity of the substrate layer (through-plane), determined in accordance with ASTM E 1461: 2013, is preferably ≥0.45 W/(m·K).

The gloss of the substrate layer, determined in accordance with ASTM D 523-14, is preferably >90°, more preferably >92°, more preferably still ≥94°.

More preferably still, the Vicat temperature of the composition of the substrate layer, determined in accordance with DIN ISO 306:2014-3, is additionally ≥141° C., particularly preferably ≥142° C.

Due to the requirements placed, it is particularly preferable for all of these properties to be satisfied together.

The compositions of the substrate layer according to the invention, containing components a to c and optionally d and optionally blend partners, are produced by standard incorporation processes via combination, mixing and homogenization of the individual constituents, with in particular the homogenization taking place preferably in the melt under the action of shear forces. Combination and mixing is optionally effected prior to melt homogenization using powder premixes.

It is also possible to use premixes of pellets, or of pellets and powders, with components b, c and optionally d.

It is also possible to use premixes produced from solutions of the mixture components in suitable solvents where homogenization is optionally effected in solution and the solvent is then removed.

In particular, the components b, c and optionally d of the composition according to the invention may here be introduced into the polycarbonate, optionally into the polycarbonate with blend partners, by known processes or in the form of a masterbatch.

Preference is given to the use of masterbatches for introducing components b, c and optionally d, individually or in a mixture.

In this connection, the composition according to the invention can be combined, mixed, homogenized and subsequently extruded in customary apparatuses such as screw extruders (ZSK twin-screw extruders for example), kneaders or Brabender or Banbury mills. The extrudate may be cooled and comminuted after extrusion. It is also possible to premix individual components and then to add the remaining starting materials individually and/or likewise mixed.

The combining and mixing of a premix in the melt may also be effected in the plasticizing unit of an injection molding machine. In this case, the melt is directly converted into a molded article in the subsequent step.

The compositions according to the invention can be processed in a customary manner in standard machines, for example in extruders or injection molding machines, to give any molded articles. Dynamic temperature control of the mold is used during the injection molding when producing the substrate layer of the layer structure according to the invention. The conditions for this are typically ascertained by the machine operator in line with their specialist knowledge. In the dynamic temperature control of the mold for the production of a substrate layer of a layer structure according to the invention, a melt temperature of 300 to 340° C., a mold temperature of 140 to 170° C., an injection speed of 40 to 80 mm/s and a hold pressure of 700 to 900 bar are typically selected conditions; by way of example a melt temperature of 330° C., a mold temperature of 160° C., an injection speed of 40 mm/s and a hold pressure of 900 bar.

EXAMPLES

1. Description of Raw Materials and Test Methods

The polycarbonate compositions described in the examples which follow were produced by compounding on an MX58 co-kneader from BUSS at a throughput of 80 kg/h. The melt temperature was between 250-310° C., and the kneader housing, kneader shaft and discharge housing and shaft of the discharge screw had a defined temperature of 260° C. The temperature of the die plate was 300° C. Component b was added together with a powder premix (polycarbonate powder+additives) via a side extruder and component c was added directly via the main intake.

Component a: Linear polycarbonate based on bisphenol A having a melt volume-flow rate MVR of 19 cm$^3$/(10 min) (according to ISO 1133:2012-03, at a test temperature of 300° C. and under a load of 1.2 kg).

Component b-1: Expanded graphite: Ecophit® GFG 900 from SGL Carbon GmbH with a D(0.5) of approx. 900 μm according to DIN 51938:2015-09.

Component b-2: Expanded graphite: SC 4000 O/SM with a D(0.5) of approx. 1000 μm according to DIN 51938: 2015-09 from Graphit Kropfmuhl GmbH.

Component c: Fused silica: Amosil FW 600 from Quarzwerke GmbH in Frechen, unsized, with a median particle size D(0.5) of approx. 4 μm, D(0.98) of approx. 13 μm, a D(0.1)/D(0.9) ratio of approx. 1.5/10 and a specific surface area of approx. 6 m$^2$/g, determined in accordance with DIN-ISO 9277:2014-01.

Component c*: Compacted talc having a talc content of 98% by weight, an iron oxide content of 1.9% by weight, an aluminum oxide content of 0.2% by weight, ignition loss (DIN 51081/1000° C.) of 5.4% by weight, pH (according to EN ISO 787-9:1995) of 9.15, D(0.5) (sedimentation analysis) of 2.2 μm; BET surface area according to ISO 4652:2012-06 of 10 m$^2$/g, brand: Finntalc M05SLC, manufacturer: Mondo Minerals B. V.

Component d-1: "Wax". A maleic anhydride-modified polypropylene copolymer from Honeywell (AC907P) having an average molecular weight (gel permeation chromatography in ortho-dichlorobenzene at 150° C. with polystyrene calibration) $M_w$=20 700 g/mol, $M_n$=1460 g/mol and with an acid number of 78 mg KOH/g (ASTM D-1386:2015).

As a measure of the heat distortion resistance, the Vicat softening temperature VST/B50 or B120 was determined in accordance with DIN ISO 306:2014-3 on test specimens measuring 8 mm×10 mm×4 mm with a 50 N ram load and a heating rate of 50° C./h or 120° C./h using a Coesfeld Eco 2920 instrument from Coesfeld Materialtest.

The coefficients of thermal expansion (CLTE) were measured in accordance with DIN 53752:1980-12 (coefficient of linear thermal expansion, parallel/perpendicular, at 23-60° C. (with a heating rate of 3 K/min).

The thermal conductivity TC in injection molding direction (in-plane) at 23° C. was determined in accordance with ASTM E 1461:2013 on specimens having dimensions of 60 mm×60 mm×2 mm.

The thermal conductivity TC in injection molding direction (through-plane) at 23° C. was determined in accordance with ASTM E 1461:2013 on specimens having dimensions of 60 mm×60 mm×2 mm.

The melt viscosities were determined in accordance with ISO 11443:2014-04 with a Göttfert Visco-Robo 45.00 instrument (cone/plate arrangement).

The density was determined in accordance with ISO 1183-1:2012.

The gloss was determined in accordance with ASTM D 523-14.

The test specimens used for determining the surface quality were produced by the injection molding process using dynamic temperature control of the mold. The materials were processed with a melt temperature of 330° C. and a mold temperature of 166° C. (heating) and 85° C. (cooling). The injection speed was 40 mm/s and the hold pressure was 900 bar.

Following the tests, a metal layer was applied to the substrate layer by the following method:

The coating system consisted of a vacuum chamber in which the specimens were positioned on a rotating specimen holder. The specimen holder rotated at about 20 rpm. Before they were introduced into the vacuum chamber, the test specimens were blown with ionized air in order to free them of dust. For the metallization, Ar gas was admitted at a pressure of $5 \cdot 1 \cdot 10^3$ mbar. Using a DC magnetron, an aluminum layer of approx. 200 nm thickness was applied to the specimens with a power density of 6.4 W/cm$^2$.

2. Formulations and Results

CLTE, here 0.98). The addition of or partial substitution of the filler with graphite makes it possible to increase the thermal conductivity; however, the dimensional stability of the overall composition is reduced as a result of the platelet-form particle geometry thereof. At small concentrations of graphite (C2 and C3), although the CLTE ratio (and hence the degree of isotropy) is still very close to the ideal value (CLTE$_{parallel}$=CLTE$_{perpendicular}$=1.0), the thermal conductivity is increased only minimally, even with a total filler content of 45%. The addition of 5%-7.5% by weight of graphite (I1-I3) offers an optimal balance between in-plane thermal conductivity (>0.85 W/mK) and isotropy (≥0.84).

The choice of the graphite also has an influence on these properties on account of the particle size distributions. For instance, with graphite b2, at least in a low concentration, a relatively low thermal conductivity is achieved (cf. I4 and I1). Although the compositions I3 and C5 have the same CLTE quotients, the higher filler content in I3 (45%) is preferred since it results in a lower CLTE and hence reduced shrinkage characteristics.

A further disadvantage of high graphite amounts is the surface quality (measured using the degree of gloss). This becomes clear from C4 and C5, the degree of gloss of which is far below that of the other compositions comprising less graphite. While the combination of graphite and talc as filler (C6 and C7) leads to high thermal conductivities even at

TABLE 1

Compositions I1 to I4 according to the invention and comparative examples C1 to C7

|  |  | C1 | C2 | C3 | I1 | I2 | I3 | C4 | I4 | C5 | C6 | C7 |
|---|---|---|---|---|---|---|---|---|---|---|---|---|
| Formulation |  |  |  |  |  |  |  |  |  |  |  |  |
| a | % by wt | 59.37 | 59.37 | 54.37 | 59.37 | 56.87 | 54.37 | 60.00 | 60.00 | 59.60 | 74.75 | 74.00 |
| b-1 | % by wt |  | 1 | 1 | 5 | 7.5 | 7.5 | 10 |  |  |  | 5 |
| b-2 | % by wt |  |  |  |  |  |  |  | 5 | 10 | 5 |  |
| c | % by wt | 40 | 39 | 44 | 35 | 35 | 37.5 | 30 | 35 | 30 |  |  |
| c* | % by wt |  |  |  |  |  |  |  |  |  | 20 | 20 |
| d-1 | % by wt |  |  |  |  |  |  |  |  |  |  | 1 |
| further additives d-2, d-3, d-4: | % by wt | 0.075/ | 0.075/ | 0.075/ | 0.075/ | 0.075/ | 0.075/ |  |  | 0.1/ | 0.25/ | —/— |
| (heat stabilizer/mold-release agent/carbon black) |  | 0.4/0.16 | 0.4/0.16 | 0.4/0.16 | 0.4/0.16 | 0.4/0.16 | 0.4/0.16 |  |  | 0.3/— |  |  |
| Tests |  |  |  |  |  |  |  |  |  |  |  |  |
| melt viscosity at 300° C. | Pa · s | 286 | 320 | 330 | 358 | 406 | 438 | 395 | 296 | 357 | 145 | 223 |
| TC (in-plane) | W/(m · K) | 0.32 | 0.49 | 0.47 | 0.96 | 1.58 | 1.71 | 1.88 | 0.89 | 1.87 | 1.7 | 1.57 |
| TC (through-plane) | W/(m · K) | 0.26 | 0.36 | 0.38 | 0.47 | 0.59 | 0.61 | n.m. | n.m. | n.m. | 0.4 | n.m. |
| VST/B50 | [° C.] | 142 | 142 | 142 | 142 | 142 | 142 | 148 | 147 | 148 | 139 | 147 |
| CLTE parallel (RT-60° C.) | ppm/K | 44 | 43 | 43 | 40 | 36 | 35 | 36 | 42 | 36 | 37 | 40 |
| CLTE perpendicular (RT-60° C.) | ppm/K | 45 | 46 | 44 | 46 | 43 | 41 | 45 | 46 | 43 | 49 | 55 |
| ratio of CLTEparallel/CLTE perpendicular |  | 0.98 | 0.93 | 0.96 | 0.87 | 0.84 | 0.84 | 0.81 | 0.90 | 0.84 | 0.76 | 0.72 |
| density | g/cm$^3$ | 1.46 | 1.46 | 1.50 | 1.46 | 1.48 | 1.50 | 1.44 | 1.43 | 1.46 | 1.38 | 1.37 |
| gloss (at 20°) | ° | 102 | n.m. | 100 | 100 | 97 | 94 | 73 | 103 | 90 | n.m. | 103 | n.m.: not measured

The thermal conductivity of a composition is determined via the fillers introduced and the proportion by weight/volume thereof. The filler-specific thermal conductivity decisively determines the degree of thermal conductivity of the overall composition. The use of a poorly thermally conductive filler such as quartz results, at a concentration of 40% by weight (C1), in an overall thermal conductivity (in-plane) of 0.32 W/mK, which is too low for the intended purpose. A major advantage of quartz as spherical filler is the maintenance of high dimensional stability of the composition (expressed by the ratio of parallel to perpendicular relatively low total filler contents, it has (as a result of the platelet-form particle geometry as in the case of graphite) the major disadvantage of reduced dimensional stability (see the CLTE quotient). Moreover, talc can be incorporated into polycarbonate only with the aid of a waxy stabilizer (d). However, this stabilizer results during processing in the formation of streaks on the surface, which has an adverse effect on the metal adhesion and the thermal stability of a reflector structure.

It can be seen on the basis of the examples shown that only a balanced ratio of quartz and graphite (I1-I3, I4)

results in a good property combination profile of CLTE, CLTE quotient, thermal conductivity and surface quality (gloss).

The invention claimed is:

1. A layer structure, comprising
   i) a substrate layer made of a thermoplastic polycarbonate-based composition and
   ii) a metal layer applied to the substrate layer i, wherein the thermoplastic polycarbonate-based composition of substrate layer i contains the following components:
   a) 44% to 63% by weight of aromatic polycarbonate,
   b) 3% to 8% by weight of expanded graphite,
   c) 34% to 38% by weight of fused silica,
   d) 0% to 10% by weight of one or more further additives, wherein the total amount of expanded graphite and fused silica is at least 40% by weight.

2. The layer structure as claimed in claim 1, wherein the thermoplastic polycarbonate-based composition of substrate layer i contains
   a) 54% to 60% by weight of aromatic polycarbonate,
   b) 5% to 7.5% by weight of expanded graphite,
   c) 35% to 37.5% by weight of fused silica,
   d) 0% to 5% by weight of one or more further additives.

3. The layer structure as claimed in claim 1, wherein the substrate layer has been produced by injection molding with dynamic temperature control of a mold.

4. The layer structure as claimed in claim 1, wherein the layer structure comprises no further layers other than optionally one or more protective layers.

5. The layer structure as claimed in claim 1, wherein the thermoplastic polycarbonate-based composition of substrate layer i consists of components a to c and optionally d.

6. The layer structure as claimed in claim 1, wherein the group of the further additives consists of the group of flame retardants, heat stabilizers, antistats, UV absorbers, IR absorbers, anti-dripping agents, impact modifiers, antioxidants, inorganic pigments, carbon black, organic colorants, inorganic fillers and/or mold-release agents.

7. The layer structure as claimed in claim 1, wherein a D(0.5) of the expanded graphite is 700 μm to 1200 μm, determined by sieve analysis in accordance with DIN 51938: 2015-09.

8. The layer structure as claimed in claim 1, wherein a D(0.5) of the fused silica is 2.5 μm to 8.0 μm, determined in accordance with ISO 13320:2009-10.

9. The layer structure as claimed in claim 1, wherein D(0.5) of the fused silica is 3 μm to 5 μm, determined in accordance with ISO 13320:2009-10.

10. The layer structure as claimed in claim 1, wherein for the substrate layer a ratio of a longitudinal and transversal CLTE value (longitudinal: transversal), determined in accordance with DIN 53752-Method A: 1980, is ≥0.84 and an in-plane thermal conductivity, determined in accordance with ASTM E 1461:2013, is >0.7 W/(m·K) and a Vicat temperature, determined in accordance with DIN ISO 306: 2014-3, is ≥141° C. and a gloss, determined in accordance with ASTM D 523-14, is >90°.

11. The layer structure as claimed in claim 1, wherein the metal layer ii has a thickness of ≥60 nm to ≤300 nm, determined by atomic force microscopy.

12. A component comprising a layer structure as claimed in claim 1.

13. The component as claimed in claim 12, wherein the component is a reflector or a mirror element of a head-up display.

14. The component as claimed in claim 13, wherein the component is a headlamp reflector.

15. A method for producing a layer structure as claimed in claim 1, wherein
   a) the substrate layer is formed from the thermoplastic polycarbonate-based composition by one-component injection molding with dynamic temperature control of a mold and then
   b) a metal layer is applied to this substrate layer.

* * * * *